(12) United States Patent
Weiss

(10) Patent No.: US 12,091,132 B2
(45) Date of Patent: Sep. 17, 2024

(54) SELF-BALANCING, ELECTRONICALLY-ASSISTED, RIDEABLE DEVICES

(71) Applicant: Joel Weiss, Monsey, NY (US)

(72) Inventor: Joel Weiss, Monsey, NY (US)

(73) Assignee: Joel Weiss, Monsey, NY (US)

( * ) Notice: Subject to any disclaimer, the term of this patent is extended or adjusted under 35 U.S.C. 154(b) by 0 days.

(21) Appl. No.: 18/114,464

(22) Filed: Feb. 27, 2023

(65) Prior Publication Data

US 2023/0234669 A1    Jul. 27, 2023

Related U.S. Application Data

(63) Continuation of application No. 16/735,987, filed on Jan. 7, 2020, now Pat. No. 11,591,041.

(60) Provisional application No. 62/788,982, filed on Jan. 7, 2019.

(51) Int. Cl.
| | |
|---|---|
| *B62M 6/40* | (2010.01) |
| *B62K 11/00* | (2006.01) |
| *B62M 1/12* | (2006.01) |
| *B62K 3/00* | (2006.01) |
| *B62M 1/14* | (2006.01) |
| *B62M 1/28* | (2013.01) |

(52) U.S. Cl.
CPC ............. *B62M 6/40* (2013.01); *B62K 11/007* (2016.11); *B62M 1/12* (2013.01); *B62K 3/005* (2013.01); *B62M 1/14* (2013.01); *B62M 1/28* (2013.01)

(58) Field of Classification Search
CPC . B62M 6/40; B62M 1/12; B62M 1/14; B62M 1/28; B62M 1/36; B62K 11/007; B62K 3/005
See application file for complete search history.

(56) References Cited

U.S. PATENT DOCUMENTS

| | | | | |
|---|---|---|---|---|
| 9,079,633 | B2* | 7/2015 | Yeh | B62K 1/00 |
| 9,933,287 | B2* | 4/2018 | Simpson | G01D 13/265 |
| 2006/0108156 | A1* | 5/2006 | Heinzmann | B60L 50/20 |
| | | | | 180/8.2 |
| 2011/0221160 | A1* | 9/2011 | Shaw | B60L 7/12 |
| | | | | 280/205 |
| 2015/0367909 | A1* | 12/2015 | Haan | B62M 9/02 |
| | | | | 280/234 |

* cited by examiner

*Primary Examiner* — Jacob D Knutson
*Assistant Examiner* — Marlon A Arce
(74) *Attorney, Agent, or Firm* — Weiss & Arons LLP

(57) ABSTRACT

A motorized self-balancing vehicle is provided. The vehicle may include at least two wheels. The vehicle may include a self-balancing mechanism. The vehicle may include a manual-drive mechanism. The self-balancing mechanism may constantly update the self-balancing vehicle in order to maintain the balance of a rider of the vehicle, while the rider is engaged in human motion on the manual-drive mechanism. The human motion may include pedaling and/or stepping. The vehicle may include an electric motor. The vehicle may include only an electric motor. The vehicle may include only a manual-drive mechanism. The vehicle may include both the manual-drive mechanism and the electric motor. In the embodiment including the manual-drive mechanism and the electric motor, the power generated by the electronic motor may be combined with power generated by the manual-drive mechanism in order to move the vehicle.

21 Claims, 5 Drawing Sheets

SELF-BALANCING, ELECTRONICALLY-ASSISTED, RIDEABLE DEVICES

CROSS REFERENCE TO RELATED APPLICATION

This application is a non-provisional application of U.S. Provisional Application No. 62/788,982 filed on Jan. 7, 2019, entitled "SELF-BALANCING, ELECTRONICALLY-ASSISTED, RIDEABLE DEVICES".

FIELD OF TECHNOLOGY

This invention relates to self-balancing rideable devices.

BACKGROUND OF THE DISCLOSURE

Segway™ devices are well-known. These devices are self-balancing rideable devices.

One issue associated with these devices is that they produce fatigue because the riders are required to constantly balance with his or her feet. Another issue associated with these devices is that they produce fatigue with lower extremities. One reason fatigue is produced because the riders are required to turn with his or her knees. An additional issue with these devices is that many of the Segway models do not require substantial physical exertion. Therefore, usage of the Segway models does not realize any exercise gains for a user.

SUMMARY OF THE DISCLOSURE

Apparatus and methods for a ridable device is provided. The device may be self-balancing. The device may be electronically-assisted. The device may be pedal assisted.

The device may include a longitudinal axis. The device may include a front. The front may be oriented in the forward direction when the device is traveling forward. The device may have a back. The back may be oriented in a rearward direction when the device is traveling forward. The longitudinal axis may run from a location at the rear of the device to a location at the front of the device.

The device may include two wheels. Each of the wheels may have a rotational axis about which each (and both) of the wheels rotates. A third and/or fourth wheel may be located forward of the two wheels to provide additional balance. The rotational axis may be orthogonal to the longitudinal axis.

The device may include a self-balancing module. The self-balancing module may balance the device on the two wheels relative to a surface upon which the device is traveling. The self-balancing module may include one or more hand-actuated and/or foot-actuated mechanisms for controlling the traveling direction of the device during travel.

The self-balancing module comprises one or more foot-actuated mechanisms for controlling an angle of the longitudinal axis relative to the surface. The self-balancing module comprises one or more hand-actuated mechanisms for adjusting an angle of the longitudinal axis of the device relative to the surface. Such adjustment may adjust the power applied to the electric motor of the vehicle and/or braking power applied to the vehicle as will be discussed in more detail below.

The device may include an electronic-assist mechanism. The electronic-assist mechanism may include an electronic motor. The electronic motor may be powered by electrical energy. The electrical energy may be sourced, in whole or in part, from one or more batteries. The electrical energy may be sourced, in whole or in part, from a solar energy source. The solar energy source may be solar panels incorporated into the device. The electronic motor may provide electromotive force to the electronic-assist mechanism. The electronic-assist mechanism may be configured to assist a user operating the device.

The device may include a manual drive module. The manual drive module may include a pedal and chain mechanism. The pedal and chain mechanism may transform physical force applied to the pedal and chain mechanism into motive force for the device. The manual drive module may include an alternating-foot-pressure and chain mechanism. The alternating-foot-pressure and chain mechanism may transform physical force applied to the alternating-foot-pressure and chain mechanism into motive force for the device. The manual drive module may include an alternating-hand-pressure (or, in the alternative, a hand-pressure) and chain mechanism. The alternating-hand-pressure (or, in the alternative, hand-pressure) and chain mechanism may transform physical force applied to the alternating-hand-pressure (or, in the alternative, hand-pressure) and chain mechanism into motive force for the device. The manual drive module may include an alternating-foot-pressure and/or alternating-hand-pressure (or, in the alternative, hand-pressure) mechanism. In certain embodiments, the wheels may be rotatable by hand-pressure directly applied by the rider to the wheels.

The device may include a seat. The seat may be located at a first distance from the longitudinal axis. The pedal and chain may comprise a first rotational axis about which two pedals rotate. The first rotational axis may be orthogonal to the longitudinal axis. The device may be configured such that a rider is disposed in a recumbent position on the device when the device is traveling.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
FIG. 1 shows a prior art apparatus.

Apparatus for a ridable device is provided. The device may be self-balancing. The device may be electronically-assisted.

The device may include a longitudinal axis. The device may include a transverse axis. The transverse axis may be orthogonal to the longitudinal axis. The device may include two wheels. Both of the wheels may share a rotational axis about which each of the wheels rotate. The rotational axis may be parallel to the transverse axis. The device may include a forward orientation.

The device may include a self-balancing module. The self-balancing module may balance the device on two wheels relative to a surface upon which the device is traveling. The self-balancing module may include one or more foot-actuated mechanisms for controlling the traveling direction of the device during travel. The self-balancing module may include one or more hand-actuated mechanisms. The one or more hand-actuated mechanisms may control the traveling direction of the device during travel. The self-balancing module may include one or more foot-actuated mechanisms. The one or more foot-actuated mechanisms may control an angle of the longitudinal axis relative to the surface. The self-balancing module may include one or more hand-actuated mechanisms. The one or more hand-actuated mechanisms may control an angle of the longitudinal axis of the device relative to the surface.

The device may include an electronic-assist mechanism. The electronic-assist mechanism may include an electronic motor. The electronic motor may be powered by electrical energy. The electrical energy may be derived at least partially from a battery. The battery may be included in the device. The battery may be re-chargeable. In some embodiments, the battery may be charged by the rider's motion and/or braking.

The electronic motor may provide electro-motive force to the electronic-assist mechanism and, or, directly to the device. The electronic-assist mechanism may be configured to assist a user operating the device.

The device may include a manual drive module. The manual drive module may convert manual energy into power. The power may be for powering the device. The manual drive module may include a pedal and chain mechanism. The pedal and chain mechanism may transform physical force applied to the pedal and chain mechanism into motive force for the device.

The manual drive module may include an alternating-foot-pressure and chain mechanism. The alternating-foot-pressure and chain mechanism may transform physical force applied to the alternating-foot-pressure and chain mechanism into motive force for the device.

The manual drive module may include an alternating-hand-pressure (or, in the alternative, hand pressure) and chain mechanism. The alternating-hand-pressure (or, in the alternative, hand pressure) and chain mechanism may transform physical for applied to the alternating-hand-pressure (or, in the alternative, hand pressure) and chain mechanism into motive force for the device.

The device may also include a seat. The seat may be located at a first distance from the rotational axis and may cause the rider to face along the longitudinal axis. The pedal and chain mechanism may include a second rotational axis about which two pedals rotate. The second rotational axis may be orthogonal to the longitudinal axis. In some embodiments, the rider may be disposed in a recumbent position on the device when the device is traveling.

FIG. 1 shows a prior art electrically-assisted bicycle. A prior art electrically-assisted bicycle may include two wheels. The two wheels may be arranged along a longitudinal axis of the bicycle. A prior art bicycle may also include a pedal mechanism. The pedal mechanism may be used to move the wheels in order to drive a rider. The pedal mechanism may be combined with an electric motor to power the bicycle. One of the disadvantages of an electrically-assisted bicycle is that a rider is required to balance. Another disadvantage of such a bicycle is that the speed and consistency of the bicycle is dependent on the rider's ability to pedal.

Figure 2:
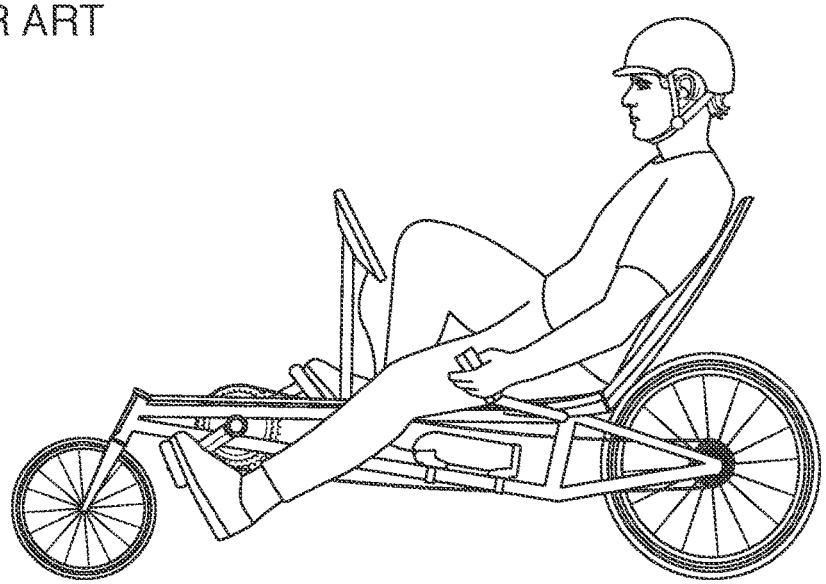
FIG. 2 shows another prior art apparatus.

FIG. 2 shows a prior art recumbent bicycle. A prior art recumbent bicycle may include two or three wheels. The prior art recumbent bicycle may operate in a similar manner to the prior art bicycle. However, a rider may sit in a recumbent position, typically on a seat, on a recumbent bicycle. One of the disadvantages specifically associated with recumbent bicycles is the large turning radius associated with such vehicles.

Figure 3:
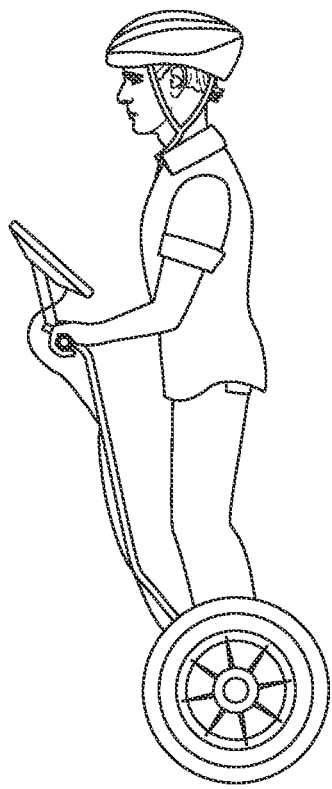
FIG. 3 shows yet another prior art apparatus.

FIG. 3 shows a prior art two-wheeled motorized personal vehicle. The vehicle consists of a platform for the feet mounted above an axle of the two wheels. The vehicle may include a post on which a handle bar is mounted. One such vehicle is the Segway™ line of products, manufactured by Deka Research of Manchester, New Hampshire.

In some embodiments, the vehicle may not include a post. Typically, two-wheeled motorized personal vehicles without posts are generally referred to as "hover boards".

In other embodiments, the vehicle may include a post that reaches the knees. A rider may slightly shift his body in relation to the Segway, move the post relative to the rest of the Segway, or an attachment to the post relative to the rest of the Segway, or in other known ways, in order to steer and/or increase/decrease the speed of the vehicle.

One of the disadvantages associated with prior art personal vehicles is the physical non-productivity of a rider. Specifically, in some prior art vehicles, a rider may derive substantially no benefit vis-à-vis the device from moving his or her body, specifically his or her legs or feet, while riding the vehicle. The human body may become uncomfortable after standing stationary for an extended amount of time. Many times, the immobile feet and/or knees of a rider become uncomfortable after riding for a specific time period. Therefore, it may be desirable to combine the rider-driven movement of bicycle or recumbent bicycle with the consistency, speed and self-balancing of a motorized personal vehicle.

Figure 4A:
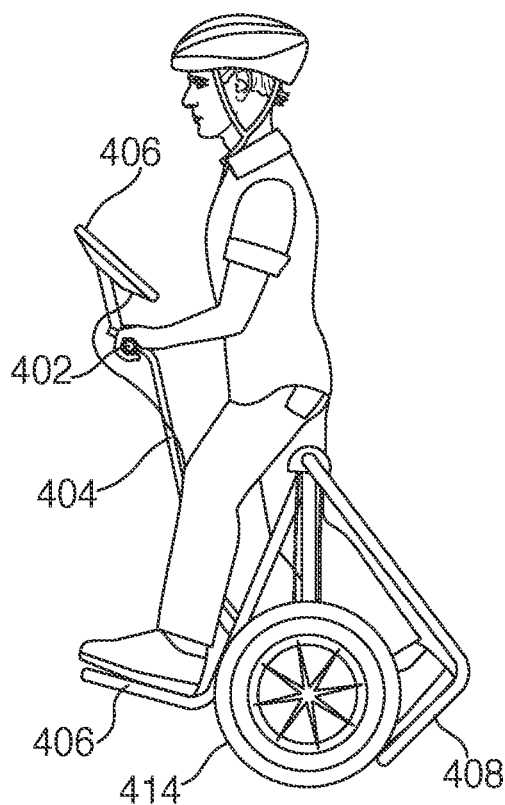
FIG. 4A shows an illustrative apparatus for use in accordance with the systems and methods of the disclosure.
Figure 4B:
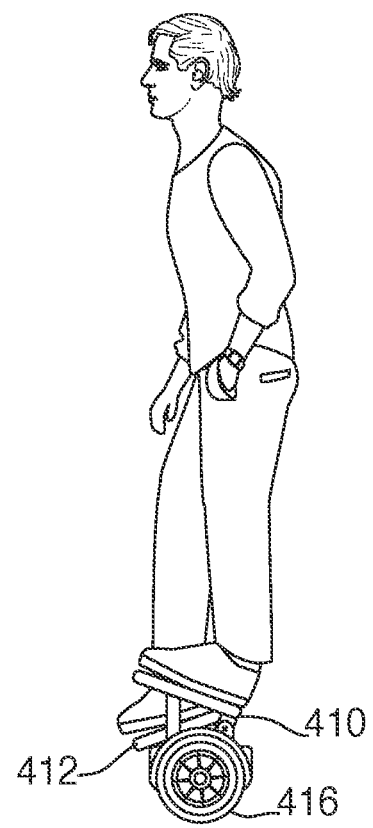
FIG. 4B shows another illustrative apparatus for use in accordance with the systems and methods of the disclosure.

FIGS. 4A and 4B show perspective views of embodiments, said embodiments regarded as inventive, of illustrative motorized, self-balancing personal vehicles in which a user may move his/her body in such a way as to obtain exercise benefits.

The vehicle may include a self-balancing mechanism. The self-balancing mechanism be constantly updated in order to balance a human in motion. The self-balancing mechanism may be adjacent to, parallel to and/or attached to wheels 414 and 416 (or the second wheel—not shown).

Body movements, such as pedaling, stepping, or any other suitable human movements may be combined with electric power in order to move the vehicle. The electric power may be generated from an electric motor integrated into the vehicle. The suitable human movements may be converted to motive force through known chain-based, or other suitable, mechanical mechanisms that are mechanically coupled to a power train of the device.

In certain embodiments, a stepping machine may be incorporated into the vehicle. A stepping machine may be a machine that enables a user to continuously step. The stepping machine may enable a user to exercise while providing motive force to the vehicle.

The vehicle shown in FIG. 4A may include handlebar 402 mounted onto a post 404. Handlebar 402 may enable a rider to steer the vehicle. Handlebar 402 and/or screen 406 mounted onto post 404 or handlebar 402, may include a set of controls. The set of controls may include one or more joysticks, or other actuators, to control the angle of the vehicle relative to the surface upon which the vehicle is traveling. The set of controls may also be used to control, at least partially, the speed at which the vehicle is traveling. In certain embodiments, the set of controls may be accessed via an application on a rider's smartphone. The smartphone may be connected to the vehicle via Bluetooth, NFC, or any other suitable communication method.

In some embodiments, the set of controls may enable a rider to set and/or modify the vehicle speed. The vehicle may augment the power generated by the rider in order to keep the vehicle driving at the desired speed. The set of controls may also enable a rider to choose a human-only setting, in which the power is completely drawn from human motion. The set of controls may also enable a rider to choose a human-assist setting, in which the power is pulled both from the human motion and the electric motor. A rider may be able to choose the amount of assistance pulled from the electric motor. For example, a rider may choose to use 30% assistance and 70% human motion, or any other suitable ratio. The set of controls may also enable a rider to choose an electric-only setting, in which a rider chooses not to use the human motion to augment the electric motor. Alternatively, the rider may apply force to the system and the system may balance between the applied force and the electrically-available power.

With respect to the device shown in FIG. 4A, a rider may move his or her feet back and forth on foot placement devices 406 and 408. It should be appreciated that foot placement devices 406 and 408, or any other devices relating to foot movements such as, for example and without limitation, pedals, foot rests, foot and leg rests, steps or any other suitable devices. In some embodiments, hand-related devices such as hand-pedaled devices, often for use by riders without fully-functioning lower extremities, may be used to substitute for part of embodiments herein.

In FIG. 4B, a rider may move his or her feet up and down on foot placement devices 410 and 412. It should be appreciated that foot placement devices 410 and 412 may be pedals, foot rests, foot and leg rests, steps or any other suitable devices.

Figure 5A:
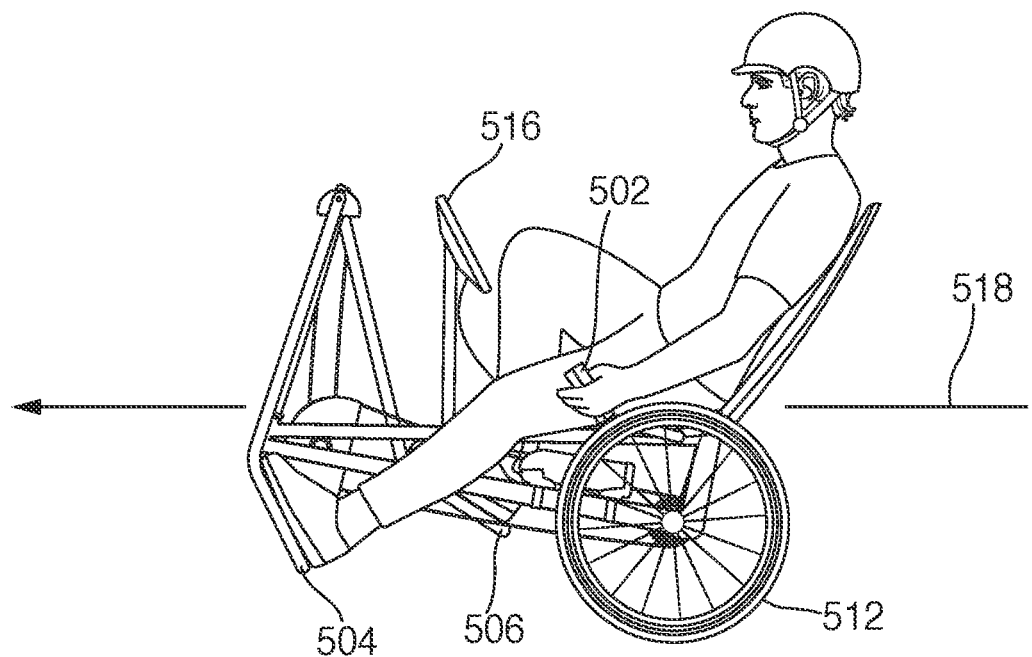
FIG. 5A shows yet another illustrative apparatus for use in accordance with the systems and methods of the disclosure.
Figure 5B:
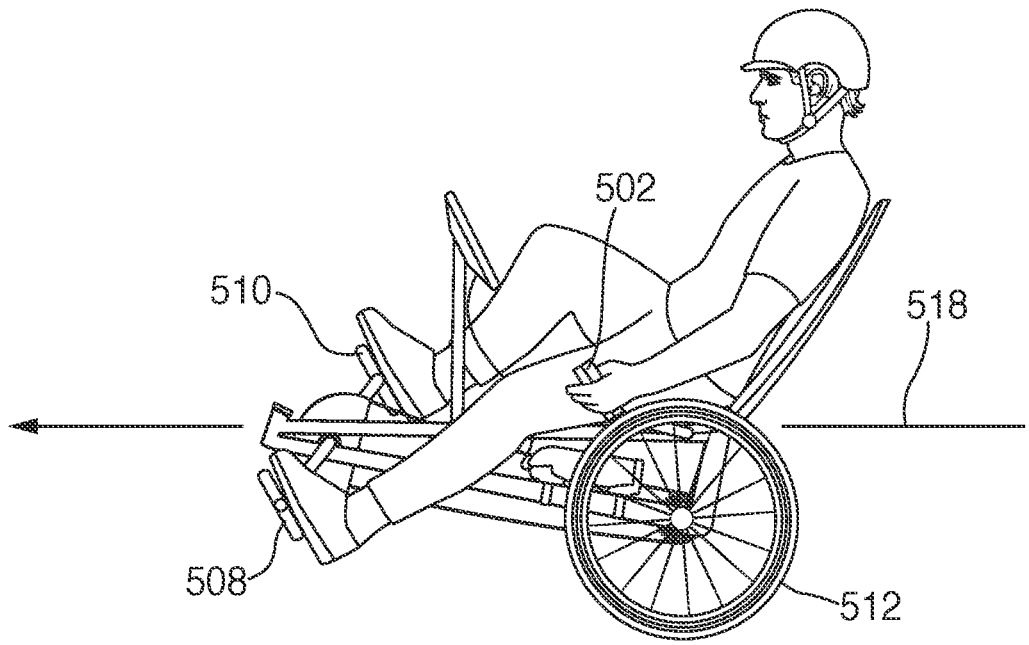
FIG. 5B shows still another illustrative apparatus for use in accordance with the systems and methods of the disclosure.
Figure 5C:
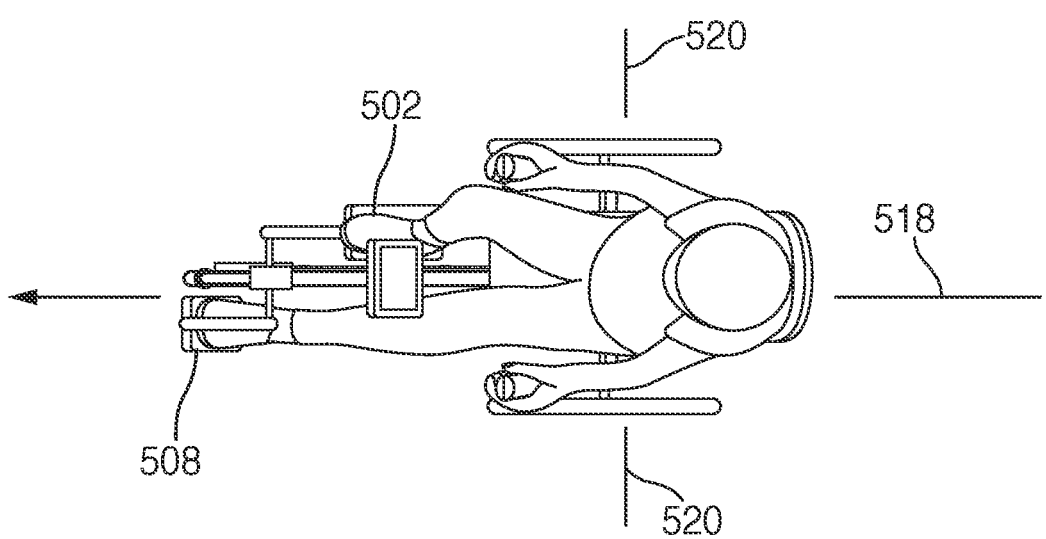
FIG. 5C shows still another illustrative apparatus for use in accordance with the systems and methods of the disclosure.

FIGS. 5A and 5B show perspective views embodiments of an illustrative recumbent vehicle according to certain embodiments. The vehicle may include screen 516. Screen 516 may function in a similar manner to screen 406 (described above). The vehicle may include handheld joysticks 502. Joysticks 502 may be used to steer the vehicle. In FIG. 5A, a rider may push his or her feet back and forth on foot placement devices 504 and 506. In FIG. 5B a rider may pedal his or her feet on pedals 508 and 510. A self-balancing mechanism may be included beneath, or attached to, wheel 512 and wheel 514 (shown in FIG. 5C) of the vehicle. The self-balancing mechanism may maintain the balance of the vehicle. It should be appreciated that the turning radius of such a recumbent vehicle may be small, or even negligible, because the vehicle may turn on its two wheels. FIGS. 5A-5C may also include a longitudinal axis 518 and/or a rotational axis 520. It should be noted that longitudinal axis 518 may be located at any suitable position that runs in a straight line—with respect to the front-facing direction of the device—from the back of the device to the front of the device. Longitudinal axis 518 may typically be orthogonal to rotational axis 520.

In some embodiments, a windshield (not shown) may be included on the illustrative recumbent vehicle. The windshield may prevent wind from disturbing the rider during travel, and may reduce friction due to air during ride. Such a windshield may, in certain embodiments, completely envelop the rider from the front, sides and/or even the back. The friction-reduction effects of the windshield should preferably be taken into account by any balancing algorithms needed to maintain the balance of the vehicle.

The vehicle may include a drivetrain. The drivetrain may include the electric assist mechanism and/or the manual drive module and the mechanism necessary for coupling the electric assist mechanism and/or the manual drive module to provide turning force to the wheels. The drivetrain may provide the power and torque necessary to turn the wheels of the vehicle. A mid-drive motor may send power directly to the drivetrain.

FIG. 5C shows a top-down view of the illustrative recumbent vehicle embodiment shown in FIG. 5B. The rider is shown situated between wheels 512 and 514. Joysticks 502, or other suitable actuation devices may enable a rider to steer, and/or control the speed of a vehicle. Pedals 508 and 510 may enable a rider to manually steer the vehicle and/or provide motive force to the vehicle. An electronic motor may enable a rider to utilize electronic power in addition to manual power. In some embodiments, the electronic motor may provide the sole motive force of the vehicle. It should be noted that the motive force may be provided, at least in part, by a user with repeated motions. Such motions may include pedaling. Such motions may include applying direct force to the wheels of the vehicle.

Thus, apparatus and methods relating to rideable devices have been provided. Persons skilled in the art will appreciate that the present invention can be practiced in embodiments other than the described embodiments, which are presented for purposes of illustration rather than of limitation.

What is claimed is:

1. A self-balancing, electronically-assisted, rideable device comprising:
   a longitudinal axis;
   a front, the front oriented in the forward direction when the device is traveling forward;
   a back, the back oriented in a rearward direction when the device is traveling forward;
   two wheels, each of the wheels rotating about a single, shared, rotational axis, said rotational axis being orthogonal to the longitudinal axis;
   a self-balancing module for balancing the device on the two wheels relative to a surface upon which the device is traveling; and
   an electronic-assist mechanism comprising an electronic motor, said electronic motor being powered by electrical energy, said electronic motor for providing electromotive force to the electronic-assist mechanism, said electronic-assist mechanism configured to assist a user operating the device;
   wherein the device further comprises:
   a manual drive module, said manual drive module comprising a pedal and chain mechanism for transforming physical force applied to the pedal and chain mechanism into motive force for the device, said device further configured to pull an amount of assistance from the electronic motor, wherein the device is further configured to prompt a user to select a ratio between the electro-motive force and the physical force applied.

2. The device of claim 1 further comprising a manual drive module, the manual drive module comprises an alternating-foot-pressure and chain mechanism for transforming physical force applied to the alternating foot pressure and chain mechanism into motive force for the device.

3. The device of claim 1 further comprising a manual drive module, the manual drive module comprises a hand-pressure and chain mechanism for transforming physical force applied to the alternating hand pressure and chain mechanism into motive force for the device.

4. The device of claim 1 wherein the self-balancing module comprises one or more foot-actuated mechanisms for controlling the traveling direction of the device during travel.

5. The device of claim 1 wherein the self-balancing module comprises one or more hand-actuated mechanisms for controlling the traveling direction of the device during travel.

6. The device of claim 1 wherein the self-balancing module comprises one or more foot-actuated mechanisms for adjusting an angle of the longitudinal axis relative to the surface.

7. The device of claim 1 wherein the self-balancing module comprises one or more hand-actuated mechanisms for controlling an angle of the longitudinal axis of the device relative to the surface.

8. The device of claim 1 wherein the device further comprises a seat located at a first distance from the longitudinal axis, and the pedal and chain comprises a first rotational axis about which two pedals rotate, said first rotational axis orthogonal to, and at a first distance from, the longitudinal axis.

9. The device of claim 8 wherein the device is configured such that a rider is disposed in a recumbent position on the device when the device is traveling.

10. The device of claim 1 wherein the device further comprises a battery and the electrical energy is sourced at least partially therefrom.

11. A self-balancing, electronically-assisted, rideable device comprising:
   a longitudinal axis;
   two wheels, both of the wheels rotating about a single, shared rotational axis, said rotational axis being orthogonal to the longitudinal axis;
   a self-balancing module for balancing the device on the two wheels relative to a surface upon which the device is traveling;
   an electronic motor, said electronic motor being powered by electrical energy, said electronic motor for providing torque to drive the device;
   wherein the device further comprises:
   a manual drive module, said manual drive module comprising a pedal and chain mechanism for transforming physical force applied to the pedal and chain mechanism into motive force for the device, said device further configured to pull an amount of assistance from the electronic motor, wherein the device is further configured to prompt a user to select a ratio between the electro-motive force and the physical force applied.

12. The device of claim 11 further comprising a manual drive module, said manual drive module for converting manual energy into power for powering the device, wherein the manual drive module comprises an alternating-foot-pressure and chain mechanism for transforming physical force applied to the alternating foot pressure and chain mechanism into motive force for the device.

13. The device of claim 11 further comprising a manual drive module, said manual drive module for converting manual energy into power for powering the device, wherein the manual drive module comprises a hand-pressure and chain mechanism for transforming physical force applied to the alternating hand pressure and chain mechanism into motive force for the device.

14. The device of claim 11 wherein the self-balancing module comprises one or more foot-actuated mechanisms for controlling the traveling direction of the device during travel.

15. The device of claim 11 wherein the self-balancing module comprises one or more hand-actuated mechanisms for controlling the traveling direction of the device during travel.

16. The device of claim 11 wherein the self-balancing module comprises one or more foot-actuated mechanisms for adjusting an angle of the longitudinal axis relative to the surface.

17. The device of claim 11 wherein the self-balancing module comprises one or more hand-actuated mechanisms for controlling an angle of the longitudinal axis of the device relative to the surface.

18. The device of claim 11 wherein the device further comprises a seat located at a first distance from the longitudinal axis.

19. The device of claim 18 wherein the device is configured such that a rider is disposed in a recumbent position on the device when the device is traveling.

20. The device of claim 11 wherein the device further comprises a battery and the electrical energy is sourced at least partially therefrom.

21. A motorized, self-balancing personal vehicle comprising:
   at least two wheels;
   a self-balancing mechanism;
   a manual-drive mechanism;
   wherein:
   the self-balancing mechanism constantly updates the self-balancing vehicle in order to maintain the balance of a rider of the vehicle; and
   wherein the manual-drive mechanism comprises pedaling and/or stepping; and
   wherein the vehicle further comprises:
   an electronic motor, wherein the power generated by the electronic motor is combined with power generated by the manual-drive mechanism in order to move the vehicle; and
   a manual drive module, said manual drive module comprising a pedal and chain mechanism for transforming physical force applied to the pedal and chain mechanism into motive force for the device, said vehicle further configured to pull an amount of assistance from the electronic motor, wherein the vehicle is further configured to prompt a user to select a ratio between the electro-motive force and the physical force applied.

* * * * *